Sept. 13, 1932. F. W. JOHNS 1,876,952
BACK-UP LIGHT
Filed Dec. 4, 1931
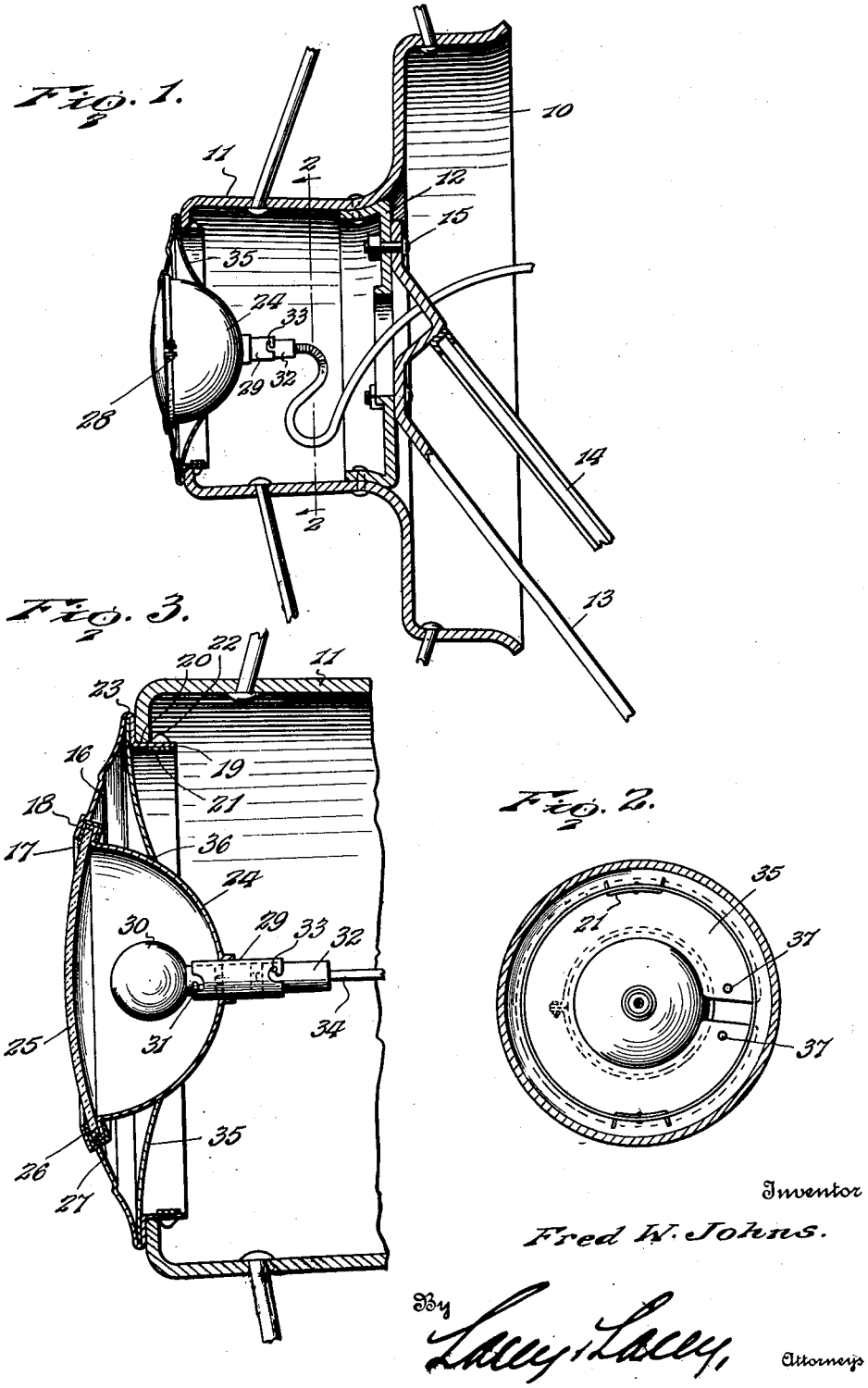
Inventor
Fred W. Johns.
By Lacey & Lacey, Attorneys Patented Sept. 13, 1932

1,876,952

UNITED STATES PATENT OFFICE

FRED W. JOHNS, OF LEE HALL, VIRGINIA

BACK-UP LIGHT

Application filed December 4, 1931. Serial No. 579,049.

This invention relates to back-up lights for automobiles and has for an object to provide a combined hub cap and back-up light for the spare wheel of an automobile.

A further object of the invention is to provide a back-up light which may be mounted in a standard hub cap by simply forming an orifice at the center of the hub cap of like diameter to receive the light.

A further object is to provide a back-up light which may be securely confined in position in the hub cap by means of a single resilient split ring clamp which holds the light against rattling and at the same time permits easy and quick application and removal of the light from the hub cap.

A still further object is to provide a back-up light and clamp of unit construction for application to hub caps now in use or hub caps during the process of manufacture.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1 is a sectional view of a spare wheel with the back-up light mounted in the hub cap, Fig. 2 is a cross sectional view, taken on the line 2—2 of Fig. 1, showing the split ring clamp in elevation, and Fig. 3 is an enlarged sectional view similar to Fig. 1 but showing the lens casing and ring clamp for the lens in section.

Referring now to the drawing in which like characters of reference designate similar parts in the various views, 10 designates a spare wheel, 11, the hub thereof, 12, the perforated hub plate for mounting the wheel on the vehicle axle, 13, the bracket for attaching the spare wheel to the rear of the automobile, and 14, the brace for the bracket, these parts being all of the usual and well known spare wheel construction. As usual, a pair of bolts 15 are passed through the bracket 13 and plate 12 to removably mount the spare on the bracket.

In carrying out the invention, the hub cap 16 is provided with a central orifice 17 of such diameter as to receive the back-up light and this orifice may, obviously, be formed in hub caps now in use or may be formed in the hub cap during the process of manufacture, it being simply necessary that the orifice be formed in such manner as to leave, at the periphery thereof, the usual flange 18 which extends outwardly from the dished contour of the hub cap to provide a seat for the hereinafter described light. The hub cap is provided, as usual, with a flange 19 which fits nicely into an opening 20 in the hub and carries, at spaced points, substantially U-shaped spring clamps 21, best shown in Fig. 2. The ends of the clamps project radially through suitable openings in the flange and are beveled, as shown at 22, to provide cam surfaces for engagement with the edge of the opening 20 to depress the clamps during application and removal of the hub. At the juncture of the flange 19 with the dished body of the hub cap, there is an annular rim 23 which is substantially U-shaped in cross section and abuts the hub 11 and the opposite side thereof from the spring clamps 21. The hub cap, just described, is of the usual standard type to be found on several popular makes of automobiles of which the Chevrolet is an example, the only modification being that there is a central opening 17 formed in the hub cap, as described.

The back-up light comprises a casing 24 and a lens 25, the casing being provided with a substantially rightangular flange 26 to seat the edge of the lens. A split ring clamp 27 of substantially U-shaped cross section embraces the lens and flange 26 to tightly secure the lens to the casing. The ends of the clamp are secured together by a bolt 28, best shown in Fig. 1, to permit removal of the lens for renewing a burned out bulb. The split ring clamp 27 is of sufficient dimensions to seat snugly in the outpressed flange seat 18 of the hub cap 16.

The casing 24 is provided with a socket 29, one end of which, as usual, projects into the casing and receives the bulb 30, the bulb being removably secured to the socket preferably by the usual bayonet joint 31. A plug 32 is removably secured in the outer end of the socket preferably by means of the usual bayonet joint 33, and is provided with a cable 34 which may be run to a suitable switch on the vehicle dash, as will be understood.

For removably securing the casing 24 to the hub cap, I provide an annular resilient split clamp ring 35 which is substantially frusto-conical in cross section, as best shown in Figs. 1 and 3. The ring is of sufficient outer diameter to be snugly received in the rim flange 23. The ring is of sufficient inner diameter to snugly bear against the convex exterior surface of the casing 24 and is preferably beveled, as shown at 36, to nicely fit the casing. A pair of openings 37 are provided near the split ends of the ring to receive a spanner wrench or similar tool for contracting the ring to permit application to or removal from the rim 23 of the hub cap. Lugs or tabs, of course, may be substituted for these openings to permit of the fingers of the operator being used to contract the ring. It will be pointed out that the resilient ring exerts considerable pressure in an axial direction upon the lamp casing and firmly holds the U-shaped clamp ring of the lens pressed into the seat in the flange 18 of the hub cap so that rattling is positively prevented.

From the above description, it is thought that the construction and operation of my invention will be fully understood without further explanation.

What is claimed is:

A back-up light comprising a hub cap dished outwardly and having a central opening, said cap having a flange at the edge of the opening forming a seat, said cap having an annular rim of substantially U-shape in cross section forming a seat, a back-up light having a casing engaged at the rim against the first named seat and having its lens exposed through said central opening in the hub cap, and a spring split clamp ring of substantially frusto-conical cross section engaged at the edge in said U-shaped seat and flaring downwardly and inwardly opposite to the dished contour of the hub cap, the inner circular edge of said ring bearing against the light casing and exerting pressure against the casing axially of the casing to firmly press the rim of the casing into the seat formed by the first named flange.

In testimony whereof I affix my signature.

FRED W. JOHNS. [L. S.]